Jan. 12, 1926.　　　　　　　　　　　　　　　　　1,569,495
G. F. IMMEL
REEL
Filed Dec. 29, 1924　　　2 Sheets-Sheet 1
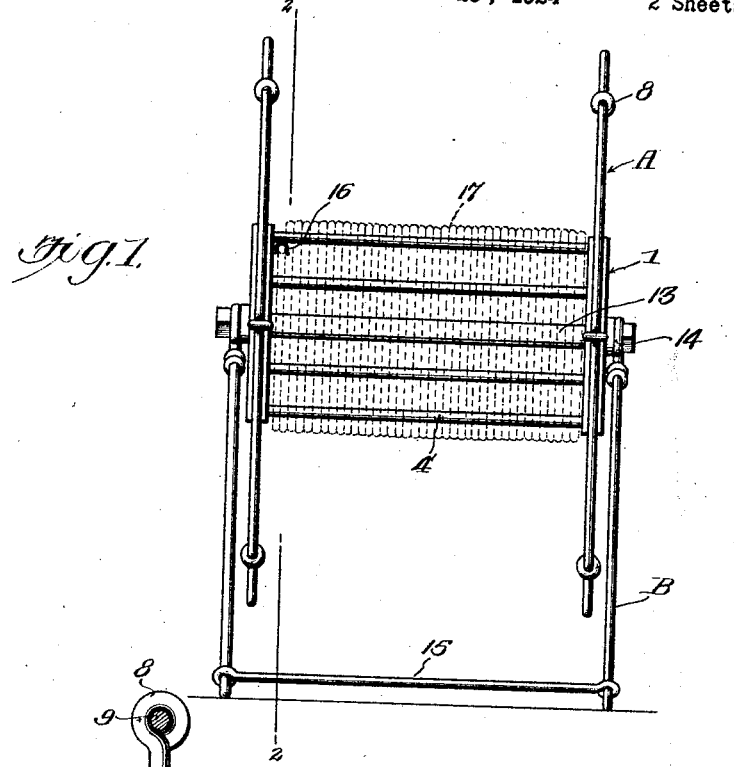
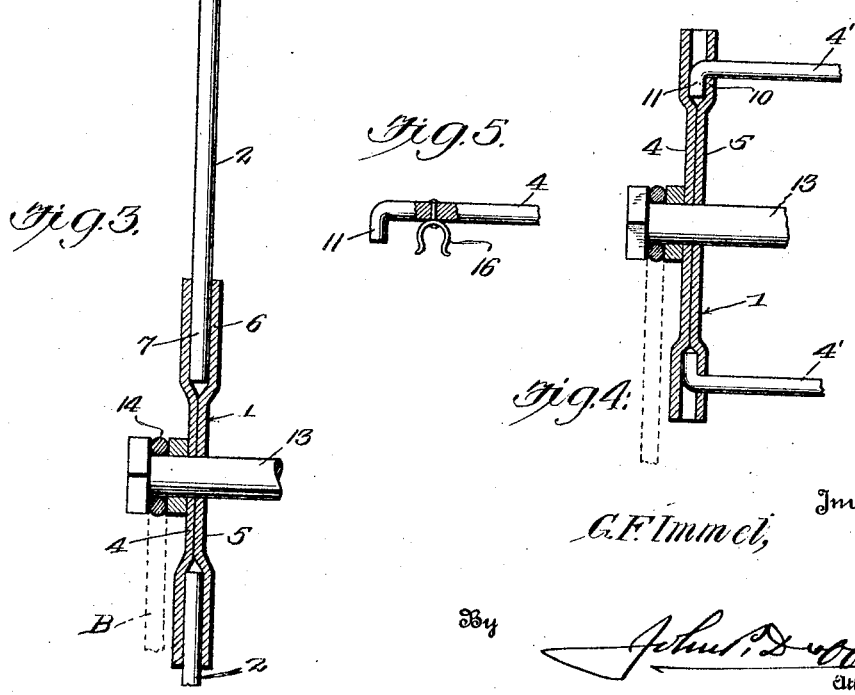

Jan. 12, 1926.
G. F. IMMEL
REEL
Filed Dec. 29, 1924   2 Sheets-Sheet 2
1,569,495
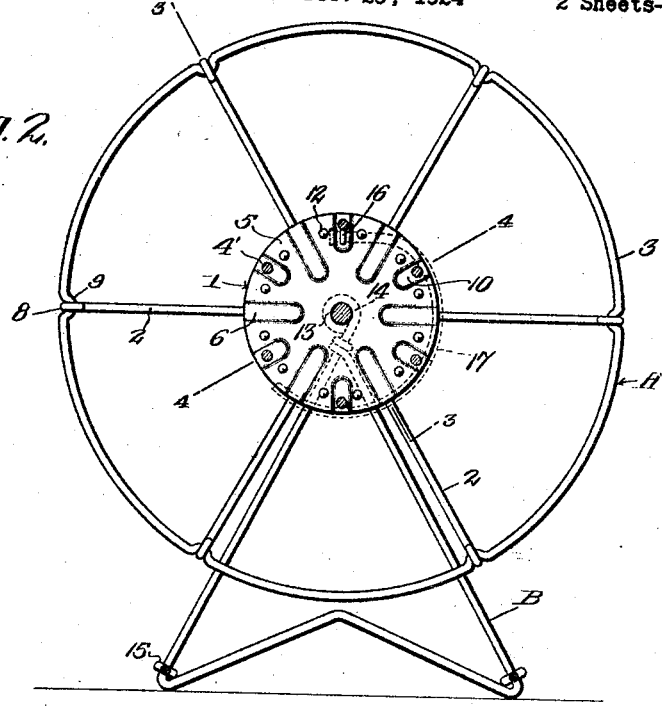
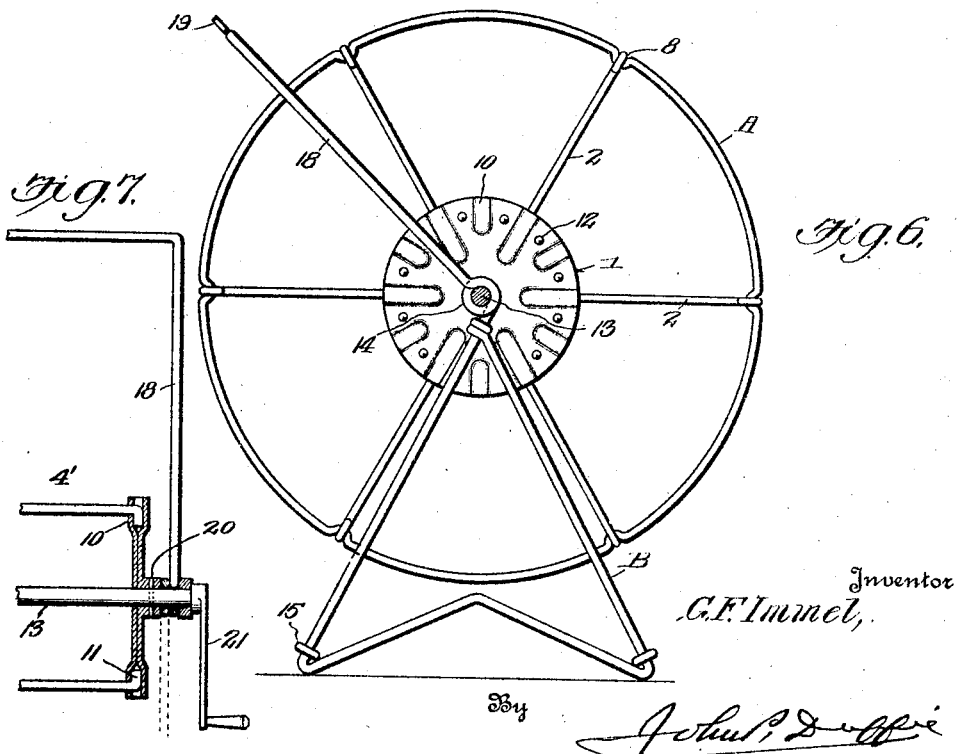
Inventor
G. F. Immel, Patented Jan. 12, 1926.

1,569,495

UNITED STATES PATENT OFFICE.

GEORGE F. IMMEL, OF WILLARD, OHIO.

REEL.

Application filed December 29, 1924. Serial No. 758,614.

*To all whom it may concern:*

Be it known that GEORGE F. IMMEL, a citizen of the United States, residing at Willard, in the county of Huron and State of Ohio, has invented certain new and useful Improvements in Reels, of which the following is a specification.

This invention relates to new and useful improvements in reels and has special reference to garden hose reels.

One object of my invention is to provide a garden hose reel which may be constructed, at a very economical cost, of sheet metal and wire rods suitably formed and connected together.

A further object of my invention is to provide a garden hose reel which is relatively light in weight and may be conveniently moved from place to place by using the reel as supporting wheels and the reel supports as handles.

With the foregoing and other objects in view that will appear as the nature of my invention is better understood, the same consists in the novel features of construction, combination and arrangement of parts illustrated in the drawings and more particularly pointed out in the appended claims.

In the accompanying drawings, which are for illustrative purposes only and are therefore not drawn to scale:

Figure 1 is a front elevation of a garden hose reel embodying my improvements.

Figure 2 is a vertical transverse section, taken on line 2—2 of Figure 1.

Figure 3 is an enlarged vertical transverse sectional view, taken on line 3—3 of Figure 2.

Figure 4 is a similar view taken on line 4—4 of Figure 2.

Figure 5 is an enlarged detail fragmentary view of one of the hub connecting rods and the hose clip associated therewith.

Figure 6 is a side elevation of my improved garden hose reel, showing an upright bracket and clip for supporting one end of the garden hose and nozzle in a stationary position without the aid of the operator.

Referring to the drawings for a more particular description of my invention and in which drawings, like parts are designated by like reference characters throughout the several views, A designates my improved garden hose reel, as a whole, consisting of the upright reel supports B and a reel proper comprising the hubs 1, radial spokes 2, rims 3 and cross rods 4' extending between the hubs.

Each of the hubs is composed of a pair of circular flat metal plates 4 and 5, formed equi-distances apart around their circumferences with radial sockets 6 to receive the inner ends 7 of the spokes 2, the outer ends of the spokes being formed with eyes 8 to receive the inwardly bent portions 9 of the circular rims 3. It will also be noted that the hubs 1 are formed in their outer edges with shorter radial sockets 10 to receive the inwardly and right angularly bent ends 11 of the cross rods 4', the sockets 10 alternating with the sockets 6 around the entire circumference of each hub. The hub plates 4 and 5 are rigidly fastened together when the inner ends of the spokes and the ends of the cross rods are fastened in place, by rivets 12 or other equivalent means. The reel is revolubly mounted a suitable distance above the ground on the stationary axle 13 mounted in loops 14 formed at the upper ends of the upright reel supports B. The reel supports B are preferably formed, each, from a single continuous piece of wire bent into substantially triangular form and are connected together at the base by the transverse brace rods 15. One of the cross rods 4 is provided with a suitable clip 16 to receive the nozzle of the hose 17 when wound on the reel and not in use. If desired, one side of the reel may be provided with an upwardly inclined bracket 18 and clip 19 to support one end of the hose and the nozzle in a stationary position and without the aid of the operator. The bracket 18 is preferably formed as a continuation of one of the reel supports B.

In the modified form of my invention illustrated in Figure 7, the reel is keyed, as at 20, to the axle 13 and may be turned through the medium of a crank 21 carried by one end of the latter. By swinging the reel supports B upwardly and rearwardly at right angles to their normal position and using the side members of the reel as wheels, the device may be easily and conveniently moved from place to place.

From the foregoing description taken in connection with the drawings, it is thought that the construction, operation and advantages of my invention will be readily understood without requiring a more extended explanation.

Various changes in the form, proportions and minor details of construction may be resorted to without departing from the principles or sacrificing any of the advantages of my invention as defined in the appended claims.

Having described my invention, what I claim as new and desire to secure by Letters Patent, is:—

1. A garden hose reel comprising upright reel supports, a transverse axle carried thereby and a reel mounted on said axle, said reel comprising inner hubs consisting, each, of a pair of flat metal plates formed in their outer edges with radially disposed alternating longer and shorter sockets, outer rings, radial spokes connected at their outer ends to said rings and arranged with their inner ends extending into said longer sockets and a circular series of cross rods for rigidly connecting the hubs together, said cross rods formed at their opposite ends with right angularly bent portions engaging the shorter sockets.

2. A garden hose reel comprising a pair of laterally spaced upright reel supports, each formed from a single continuous piece of wire, a stationary axle, loops formed at the upper ends of the reel supports and forming journals for the ends of the axle, a reel revolubly mounted on said axle, a hose supporting bracket formed by an extension of one reel support and a clip carried by said bracket.

In testimony whereof he affixes his signature.

GEORGE F. IMMEL.